Oct. 9, 1962         A. ARMEN ETAL         3,057,817
GRAFT COPOLYMERS COMPRISED OF ACRYLAMIDE AND METHACRYLAMIDE
MONOMERS ON PREFORMED N-VINYL-3-MORPHOLINONE POLYMERS,
ACRYLONITRILE POLYMER COMPOSITIONS OBTAINABLE
THEREWITH, AND METHOD OF PREPARING SAME
Filed Feb. 12, 1960

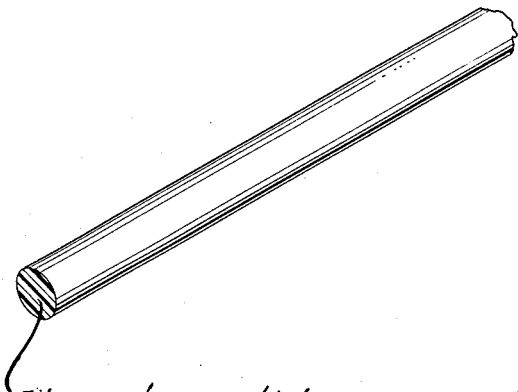

Filamentous article comprised of an acrylonitrile polymer having incorporated therein a graft copolymer comprising an acrylamide and / or methacrylamide monomer graft co-polymerized upon a PVM substrate.

INVENTORS.
Ardy Armen
Forrest A. Ehlers
BY Jerome Kudy
ATTORNEY

United States Patent Office 3,057,817
Patented Oct. 9, 1962

3,057,817
GRAFT COPOLYMERS COMPRISED OF ACRYLAMIDE AND METHACRYLAMIDE MONOMERS ON PREFORMED N-VINYL-3-MORPHOLINONE POLYMERS, ACRYLONITRILE POLYMER COMPOSITIONS OBTAINABLE THEREWITH, AND METHOD OF PREPARING SAME
Ardy Armen, Newport News, Va., and Forrest A. Ehlers, Walnut Creek, Calif., assignors to The Dow Chemical Company, Midland, Mich., a corporation of Delaware
Filed Feb. 12, 1960, Ser. No. 8,254
15 Claims. (Cl. 260—45.5)

The present invention resides in the general field of organic chemistry and contributes specifically to the polymer art, especially with respect to certain graft copolymer compositions and fiber-forming polymer blends obtainable therewith. It is particularly concerned with graft copolymers of certain acrylamide and methacrylamide monomers, hereinafter more precisely delineated, that are graft copolymerized upon or with preformed N-vinyl-3-morpholinone polymer substrates (hereinafter referred to as VM polymers), which graft copolymers have especial utility as dye-receptive and stabilizing additaments for acrylonitrile polymer compositions which, advantageously, may be of the fiber-forming variety.

The invention is also concerned with the compositions that may be obtained by blending the graft copolymers with acrylonitrile polymers, as well as with shaped articles which have been fabricated from such compositions and which, as a consequence, have significantly enhanced properties and characteristics as regards improvements in and relating to enhanced dye-receptivity and natural stability to various deteriorating influences, including stability against becoming deleteriously influenced and degraded upon exposure to heat at elevated temperatures and to light.

Within the scope and purview of the invention, there are comprehended (1) the various novel and utile graft copolymers of the indicated variety; (2) the advantageous polymer compositions, particularly fiber-forming compositions, obtained by blending the graft copolymers with acrylonitrile polymers; (3) various shaped articles fabricated from and comprised of the graft copolymer-containing acrylonitrile polymer compositions; and (4) methods for the preparation of the above-indicated compositions.

It is the main purpose and primary design of the present invention to provide and make available graft copolymers of certain acrylamide and methacrylamide monomers with or upon preformed VM polymer substrates, which graft copolymers are especially well suited for being incorporated in acrylonitrile polymer compositions, particularly compositions of polyacrylonitrile, to serve in the indicated dual capacity of dye-assisting adjuvants and stabilizing ingredients.

It is also a principal aim and chief concern of the invention to provide and make available acrylonitrile polymer compositions and shaped articles therefrom that contain the above-indicated and hereinafter more fully delineated type of graft copolymeric additaments which compositions have, as intrinsic distinguishing characteristics, excellent receptivity of and acceptability for any of a wide variety of dyestuffs and efficacious natural stability to heat and light, as well as to certain chemical conditions, such as alkaline environments.

The graft copolymers of the present invention which have the indicated capacity and utility as additaments for acrylonitrile polymer compositions are comprised of a preformed VM polymer trunk or base substrate upon or with which there is graft copolymerized certain acrylamide and methacrylamide monomers of the variety hereinafter more revealingly described.

The polymer blend compositions of the present invention which fulfill the above-indicated ends and offer corollary advantages and benefits, particularly as fiber-forming compositions as will hereinafter be manifest, are, in essence, comprised of an intimate and practically inseparable blend or alloy constitution of (A) an acrylonitrile polymer that contains in the polymer molecule at least about 80 weight percent of acrylonitrile, any balance being polymerized units of another ethylenically unsaturated monomeric material that is copolymerized with acrylonitrile, which acrylonitrile polymer is preferably of the fiber-forming variety and, most advantageously, is polyacrylonitrile (although, as indicated, satisfactory results are also achieved with fiber-forming acrylonitrile copolymers) and (B) a minor proportion of the above-indicated variety of beneficial graft copolymeric additament that functions in the described manner.

The methods of the invention by which the herein contemplated advantageous compositions may be made involve preparation of the graft copolymer, as well as incorporation of a minor proportion of the graft copolymer product as a beneficial additament in and with the acrylonitrile polymer base by any of several beneficial techniques, hereinafter more thoroughly defined, adapted to suitably accomplish the desired result.

Without being limited to or by the specific embodiments and modes of operation set forth, the invention is exemplified in and by the following didactic illustrations wherein, unless otherwise indicated, all parts and percentages are to be taken on a weight basis.

*Illustration A*

Into a 5-liter reactor that is equipped with an efficient agitator, a nitrogen inlet, and a total reflux condenser, there is charged about 1860 grams of poly-N-vinyl-3-morpholinone (PVM); about 210 grams of monomeric acrylamide; about 4.2 grams of potassium persulfate; and about 5970 grams of water. The relative viscosity of the PVM in water at 25° C. is about 1.85 at a concentration of 1 gram of the water-soluble polymer in 100 ml. of solution. The resulting mixture has a pH of about 7.2.

Under a continuously-maintained atmosphere of nitrogen and with continued stirring, the reaction mass is held at a temperature of about 60° C. over about a 4.5 hour period. At the end of this time, the reaction is terminated.

About 75 percent of the monomers are found to be converted to a water-soluble graft copolymeric product which is obtained in solution in the aqueous reaction mass.

Polyacrylonitrile fibers containing about 5 percent of the above graft copolymer product are prepared by impregnating filamentary structures that are in aquagel condition (after having been salt-spun and wet-stretched) in and with an aqueous solution of the graft copolymer that contains about 3 percent of dissolved graft copolymer solids. The polyacrylonitrile aquagel fiber employed is obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contains about 43.4 percent of dissolved zinc chloride to form a multiple filament tow. After being spun, the tow bundle of coagulated polyacrylonitrile aquagel fiber is washed substantially free from salt upon being withdrawn from the coagulating bath. The aquagel fiber, containing about two parts of water for each part of polymer therein, is then passed through the mentioned aqueous impregnating bath of the dissolved graft copolymer additive so as to become impregnated therewith to the indicated extent. After the impregnation, the aquagel fiber is stretch drawn for orientation to a length that is about thirteen times (13×) its original extruded length.

Following the impregnation and stretching, the aquagel fiber is irreversibly dried for about 15 minutes at 140° C. to destroy the water-hydrated structure and convert it to a finished fiber form. The finally obtained fiber product has a denier in the neighborhood of 3, a tenacity of about 3 grams per denier, an elongation of about 35 percent and a dry yield strength of about 1 gram per denier. The graft copolymer-containing acrylonitrile polymer fiber product is found to have excellent natural stability to heat and light as well as against becoming degraded under the influence of aqueous alkaline media at pH levels as high as 10.

In addition, the graft copolymer-containing sample has good color and hand and is dyeable with all classes of dyestuffs as applied under normal dyeing conditions.

The fiber product dyes well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL is performed at the 4 percent level according to conventional procedure in which the fiber sample is maintained for about one hour at the boil in the dye bath which contains the dyestuff in an amount equal to about 4 percent of the weight of the fiber (OWF), OWF designating on the dry weight of the fiber as defined in U.S. Patent No. 2,931,694. The dye bath also contains sodium sulfate (i.e., Glauber's salt) in an amount equal to about 15 percent OWF and has a bath-to-fiber weight ratio of about 30:1, respectively. After being dyed, the fiber is rinsed thoroughly with water and dried for about 20 minutes at about 80° C.

The dye-receptivity of the Calcodur Pink 2BL-dyed fiber is then evaluated spectrophotometrically by measuring the amount of monochromatic light having a wave length of about 520 millimicrons from a standard source that is reflected from the dyed sample. A numerical value on an arbitrarily designated scale from 0 to 100 is thereby obtained. This value represents the relative comparison of the amount of light that is reflected from a standard white tile reflector that has a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The 4 percent Calcodur Pink 2BL reflectance value of the copolymer-containing fiber product is less than 25.

The fiber product also dyes well with each of the dyestuffs included in the following tabulation when properly applied in the conventional manner:

*Illustration B*

The procedure of the first illustration is essentially repeated in several runs using the same monomeric acrylamide to prepare graft copolymers with the monomer from the following charges which are polymerized in the same way (i.e., as in the first illustration) for about 16 hours at about 50° C.

The constitution of each charge and the results are set forth in the following tabulation:

| Run | "B1" | "B2" | "B3" | "B4" |
|---|---|---|---|---|
| Acrylamide, parts | 24 | 24 | 24 | 24 |
| PVM (as in Illustration "A"), parts | 216 | 216 | 216 | 216 |
| Water, parts | 954 | 954 | 954 | 954 |
| $K_2S_2O_8$, parts | 0.24 | 0.48 | 0.96 | 0.50 |
| pH of charge | 6.4 | 6.4 | 6.4 | 7.5 |
| Percent conversion to graft copolymer | ca 90 | ca 90 | ca 90 | ca 90 |

Each of the graft copolymer products is an excellent adjuvant for acrylonitrile polymer fibers when employed for such purpose in the manner detailed in the first illustration.

Excellent results may also be obtained when the foregoing is repeated to prepare graft copolymer additives from the same or other acrylamide monomers of the subsequent Formula I upon PVM or other N-vinyl-3-morpholinone polymer substrates, such as copolymers of VM with N-vinyl-2-pyrrolidone; N-vinyl-5-methyl-2-pyrrolidone; N-vinyl-piperidone; and other N-vinyl lactam monomers; N-vinyl-2-oxazolidinone; N-vinyl-5-methyl-2-oxazolidinone; N-vinyl-5-ethyl-2-oxazolidinone; N-vinyl-2-oxazinidinone; and other N-vinyl cyclic carbamate monomers; and so forth within the compositional ranges detailed below.

Results similar to those set forth in the foregoing can also be obtained when the graft copolymeric additaments are incorporated in polyacrylonitrile and other acrylonitrile polymer fibers that contain in the polymer molecule at least about 80 weight percent of acrylonitrile to provide articles in accordance with the present invention by blending or mixing together the polymeric additament and the fiber-forming acrylonitrile polymer in a spinning composition or dope prior to its extrusion and to filamentary products by either wet-spinning or dry-spinning techniques. In such instances, incidentally, it may be desirable (in order to secure optimum benefit in the practice of the invention) to employ relatively larger quantities of the copolymeric additament than when surface impregnation is performed so that the presence of effective quantities of the additament at or near the surface of the article is assured.

The acrylamide and methacrylamide monomers that are employed for the preparation of the graft copolymeric additaments are of the general formula:

$$CH_2=CZCONQ_2 \qquad (I)$$

wherein Z is hydrogen or methyl and Q is hydrogen, methyl or ethyl. Advantageously, acrylamide or methacrylamide are employed as the monomeric constituents for the preparation of the graft copolymers of the invention. If desired, however, such monomers as N,N-di-

| Type | Name | Colour Index |
|---|---|---|
| Basic | Sevron Yellow R | Basic Yellow 11. |
| Do | Colcozine Brilliant Green | Basic Green 1. |
| Disperse Acetate | Eastman Blue BNN | Disperse Blue 3. |
| Do | Celliton Fast Pink FF3BA | Disperse Red 11. |
| Direct Aftertreated | Cuprofix Navy Blue SL | Direct Blue 171. |
| Acid-Neutral Premetallized | Cibalan Black BGL (Available from Ciba). | Unknown. |
| Do | Supralan Blue NB (Available from Gen. Dyestuff). | No Number. |
| Sulfur | So-Dye-Sul Liquid Navy GIFC | Sulfur Blue 7. |
| Naphthol | Naphthol AS-TR coupled with Fast Red Salt TRN. | Azoic Coupler 8 and Azoic Diazonium 11. | methyl-acrylamide, N,N-diethyl acrylamide, N,N-dimethyl-methacrylamide and N,N-diethylmethacrylamide may also be utilized with benefit. Of course, mixtures of the various acrylamide and methacrylamide monomers may also be used.

The N-vinyl-3-morpholinone polymers that are utilized as preformed substrates in the preparation of the graft copolymeric additaments of the present invention have, as an essential constituent of their polymeric structure, characterizing proportions of the recurring group:

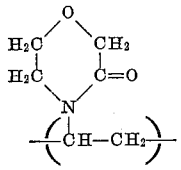

As has been indicated, copolymers of N-vinyl-3-morpholinone may also be employed. Thus, copolymers of N-vinyl-3-morpholinone with various homologous alkyl ring-substituted N-vinyl-3-morpholinone monomers may be utilized, such as copolymers of N-vinyl-3-morpholinone with N-vinyl-5-methyl-3-morpholinone, N-vinyl-5-ethyl-3-morpholinone, and the like. Copolymers of N-vinyl-3-morpholinone with various N-vinyl lactam polymers, such as N-vinyl pyrrolidone, N-vinyl-piperidone, N-vinyl caprolactam, N-vinyl-5-methyl-2-pyrrolidone and the like may also be prepared. Advantages are also achieved with copolymers of N-vinyl-3-morpholinone and various of the N-vinyl-2-oxazolidinone monomers, such as N-vinyl-2-oxazolidinone, N-vinyl-5-methyl-2-oxazolidinone, N-vinyl-5-ethyl-2-oxazolidinone, N-vinyl-2-oxazinidinone, and so forth.

These N-vinyl-3-morpholinone polymers and their preparation are discussed in U.S. Patents 2,952,668, filed April 16, 1958; 2,946,772, filed February 27, 1958; and 2,948,708, filed April 3, 1958; and in the copending application for U.S. patent having Serial No. 692,587, filed October 28, 1957, and entitled "N-Vinyl-3-Morpholinone Compounds," now U.S. Patent 2,987,509.

Advantageously, the N-vinyl-3-morpholinone polymer that is used in the manufacture of the graft copolymer product has a Fikentscher K-value between about 5–10 and about 100 and, more advantageously, between about 20–30 and 60.

Beneficially, as mentioned, the N-vinyl-3-morpholinone polymer that is utilized is a water-soluble material. In cases where N-vinyl-3-morpholinone copolymers are employed that tend to water-insolubility with decreasing proportions of N-vinyl-3-morpholinone in the copolymer molecule (as is the case with copolymers of N-vinyl-3-morpholinone and N-vinyl-5-methyl-2-oxazolidinone), it is generally most desirable for the copolymer to contain at least about 40 weight percent of the N-vinyl-3-morpholinone polymerized therein. This avoids working with a product that may have a cloud (or precipitation) point in water or other aqueous solution beneath the boil.

The graft copolymers of the present invention may generally be prepared by methods of polymerization, such as those which have been demonstrated in the foregoing illustrative examples, that employ such polymerization catalysts as persulfates, organic and inorganic peroxide and azo type materials in quantities that are conventional for such uses. The graft copolymers may oftentimes be prepared by polymerizing the monomeric constituent onto the preformed substrate polymer under the influence of high energy irradiation such as by means of X-rays, and other beta as well as gamma radiation and the like. The graft copolymers may be prepared in both aqueous and organic solvent vehicles using temperature for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the graft copolymerization may be accomplished satisfactorily within a time period of about 10 to 60 hours.

The compositions of the graft copolymeric additaments that are employed can vary within relatively wide limits. The content of the monomeric acrylamide or methacrylamide, or both, monomeric constituent may advantageously be between about 2 and 50 percent by weight of a graft copolymer, with the preformed polymer substrate consisting of the remaining 98 to 50 percent of the polymeric product. In many cases, especially to secure optimum dye-receptivity, about 5 to 20 weight percent of the graft copolymer may consist of the grafted monomeric constituent.

As indicated, the graft copolymeric additaments of the present invention are normally solid water-soluble materials having the indicated and other utilities that form viscous solutions in water. Their solubility in water in general is similar to and about commensurate with that of the preformed polymer substrate or backbone from which they are derived. In some cases, the solubility of the graft copolymer product is somewhat reduced from that of the particular preformed polymer substrate that is used in its preparation. Ordinarily, the K-value and molecular weight of the graft copolymer product is somewhat higher than that of the preformed polymer substrate from which it has been derived.

The polymerization system that is employed for the preparation of the graft copolymers used in the present invention may consist of as little as 1 or so to as much as 50 weight percent of the monomers and preformed polymer substrate to be polymerized in the aqueous or other medium. The amount of polymerizable constituents that are provided in the copolymerization system may be influenced somewhat by the manner in which it is intended to incorporate the product in the synthetic polymer compositions in order to provide the compositions of the invention. It is generally more desirable for the polymerization system to contain between about 10 and 40 weight percent of graft copolymerizable constituents.

If, for example, it is intended to incorporate the graft copolymer products by blending into a fiber-forming composition prior to its fabrication into shaped articles, the graft copolymerization system may, if desired, contain about equal proportions by weight of the charged polymerizable constituents and the polymerization medium which preferably is miscible with and tolerable in the spinning solution solvent being used. In such cases, the graft copolymer product may ordinarily be obtained as a water-soluble product that, after being dried and isolated from unreacted monomer, may readily be directly incorporated in the fiber-forming composition.

If the incorporation of the graft copolymeric additament in a fiber-forming composition is to be achieved by impregnation therewith of an already-formed shaped article of the composition, it may be desirable to effect the polymerization so as to directly form the polymerization system as a suitable applicating solution of the graft copolymeric product. For such purposes, the polymerization system may be prepared to contain as little as 1 to 5 or 10 percent by weight of the polymerizable monomeric and polymeric ingredients. Such a method for preparing the graft copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer. In such cases, it is frequently desirable for the applicating solution of the graft copolymeric additament that is employed to contain from about 1 to 3 weight percent of dissolved polymer solids.

In such instances, as has been demonstrated, the water-soluble graft copolymeric additaments may be impregnated into the fiber while it is in a swollen or gel condition, as an acrylonitrile polymer fiber in an aquagel condition, in order to obtain the desired copolymer-containing product.

If desired, the graft copolymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the graft copolymeric additament are incorporated therein. An appreciable improvement in dye-receptivity and stability may frequently be obtained when a quantity of the graft copolymeric additament that is as small as 2 (and even as low as 1 or less) weight percent is employed. Advantageously, an amount between about 2 and 15 weight percent of the copolymeric additament may thus be utilized in the composition. Greater advantages may often accrue when the amount of the copolymeric additament that is incorporated in the composition is in the neighborhood of 4–10 weight percent, based on the weight of the composition.

As has been indicated, the graft copolymeric additaments may be incorporated in the acrylonitrile polymer compositions according to various techniques. Thus, for example, the copolymeric additament and the acrylonitrile polymer may be directly blended or mixed together in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dissolving or otherwise dispersing them in a suitable liquid vehicle or medium. Or, the compositions may be provided in fiber-forming system by sequentially dispersing the polymers in any desired order in a suitable medium, as by incorporating the copolymeric additament in a prepared acrylonitrile polymer spinning solution, dope, or the like.

As is evident from the exemplifying illustrations heretofore included, a highly advantageous technique for providing the compositions, particularly when acrylonitrile polymer fiber products are involved, is to apply or impregnate the graft copolymeric additament from an aqueous dispersion thereof to a shaped acrylonitrile polymer article that is in an aquagel condition in a known manner. Thus, an acrylonitrile polymer filamentary article that has been spun from an aqueous saline spinning solution may be conveniently passed, after its coagulation and while it is in an aquagel condition, through a water bath containing the dissolved graft copolymeric additament in order to impregnate the filament with the graft copolymer and provide a composition and an article in accordance with the invention. In addition, in situ polymerization techniques may also be relied upon to provide the graft copolymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 weight percent, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole FIGURE of the accompanying drawing) have excellent physical properties and other desirable characteristics for a textile material and have a high capacity for and are readily and satisfactorily dyeable to deep and level shades with any of a wide variety of dyestuffs. By way of further illustration, they may be easily and successfully dyed according to conventional procedures using acid, vat, acetate, direct, naphthol, sulfur, basic and neutral premetallized dyestuffs.

Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index Direct Red 1—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Acid Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol ←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a good resistance to crocking. In addition, the dyed products exhibit good washfastness and retain the dye-assisting graft copolymeric additament in a substantially permanent manner, despite repeated exposure and subjection to washing, laundering and dry cleaning treatments.

What is claimed is:

1. Graft copolymer comprising between about 2 and about 50 weight percent of (a) a monomeric acrylamide compound of the general formula:

$$CH_2=CZCONQ_2 \quad (I)$$

wherein Z is selected from the group consisting of hydrogen and methyl and Q is selected from the group consisting of hydrogen, methyl and ethyl; and (b) from about 98 to about 50 weight percent of a polymer of a monoethylenically unsaturated monomeric material containing at least about 10 weight percent of N-vinyl-3-morpholinone.

2. The graft copolymer of claim 1, containing in the polymer molecule between about 5 and about 20 weight percent of said monomeric acrylamide compound graft copolymerized on said N-vinyl-3-morpholinone polymer.

3. The graft copolymer of claim 1, wherein said polymer is poly-N-vinyl-3-morpholinone.

4. Method for the preparation of a graft copolymer which comprises polymerizing between about 2 and about 50 weight percent, based on resulting graft copolymer weight, of a monomeric acrylamide compound of the formula:

$$CH_2=CZCONQ_2 \quad (I)$$

wherein Z is selected from the group consisting of hydrogen and methyl and Q is selected from the group consisting of hydrogen, methyl and ethyl; with between about 98 and about 50 weight percent of a polymer of a monoethylenically unsaturated monomeric material containing at least about 10 weight percent of N-vinyl-3-morpholinone.

5. Composition comprising a major proportion of at least about 80 weight percent, based on composition weight, of (A) a fiber-forming polymer of an ethylenically unsaturated monomeric material containing at least about 80 weight percent of acrylonitrile, and (B) a minor proportion of up to about 20 weight percent, based on the composition weight, of a graft copolymer of (a) from about 2 to about 50 weight percent of a monomeric acrylamide compound of the formula:

$$CH_2=CZCONQ_2 \quad (I)$$

wherein Z is selected from the group consisting of hydrogen and methyl and Q is selected from the group consisting of hydrogen, methyl and ethyl; and (b) from about 98 to about 50 weight percent of a preformed polymer of a monoethylenically unsaturated monomeric material containing at least about 10 weight percent of N-vinyl-3-morpholinone.

6. The composition of claim 5 containing between about 2 and about 15 weight percent, based on composition weight, of said graft copolymer.

7. The composition of claim 5, wherein said graft copolymer contains between about 5 and about 20 weight percent of said monomeric acrylamide compound graft copolymerized on said polymer.

8. The composition of claim 5, wherein component (B) is a graft copolymer of acrylamide on poly-N-vinyl-3-morpholinone.

9. The composition of claim 5, wherein component (B) is a graft copolymer of methacrylamide on poly-N-vinyl-3-morpholinone.

10. The composition of claim 5, wherein component (B) is a graft copolymer of N,N-dimethyl acrylamide on poly-N-vinyl-3-morpholinone.

11. The composition of claim 5, wherein the acrylonitrile polymer is polyacrylonitrile.

12. The composition of claim 5 dispersed in a solvent for polyacrylonitrile.

13. A filamentary shaped article comprised of the composition of claim 5.

14. Method for the preparation of a dye-receptive, antistatic, synthetic, linear hydrophobic polymer composition which comprises immersing an aquagel of a fiber forming polymer of an ethylenically unsaturated monomeric material containing at least about 80 weight percent of acrylonitrile in the form of a shaped article into a dispersion of a graft copolymer of (a) from about 2 to about 50 weight percent of a monomeric acrylamide compound of the formula:

$$CH_2=CZCONQ_2 \quad (I)$$

wherein Z is selected from the group consisting of hydrogen and methyl and Q is selected from the group consisting of hydrogen, methyl and ethyl; and (b) from about 98 to about 50 weight percent of a monoethylenically unsaturated monomeric material containing at least about 10 weight percent of N-vinyl-3-morpholinone until between about 1 and about 20 weight percent of said graft copolymer, based on resulting dry composition weight, is impregnated in said aquagel; and irreversibly drying said graft copolymer-containing aquagel to convert it from the aquagel condition to a finished shaped article form.

15. The method of claim 14, wherein said acrylonitrile polymer is polyacrylonitrile.

References Cited in the file of this patent

UNITED STATES PATENTS 2,614,289    Cresswell et al. _____ Oct. 21, 1952